Figure 1:
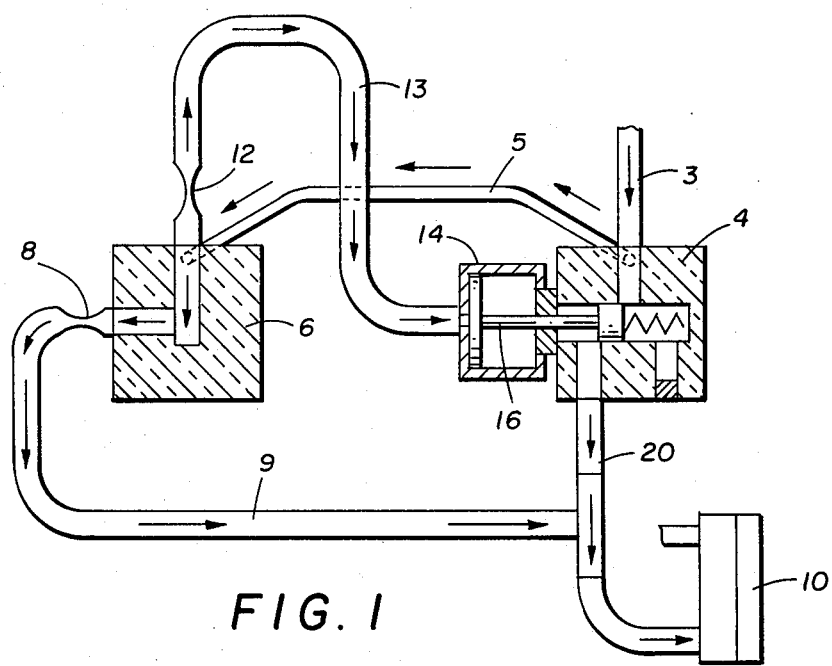

United States Patent [19]

Sprott et al.

[11] 4,294,113

[45] Oct. 13, 1981

[54] ANTI-SURGE SYSTEM FOR GASES AND OTHER MEDIA

[75] Inventors: Kenneth J. Sprott, Whitinsville; George M. Herterick, Westborough, both of Mass.

[73] Assignee: Dresser Industries, Inc., Dallas, Tex.

[21] Appl. No.: 118,263

[22] Filed: Feb. 4, 1980

[51] Int. Cl.³ ............................................. G01F 15/10
[52] U.S. Cl. ...................................... 73/199; 137/110
[58] Field of Search ......................... 73/199, 203, 707; 138/40, 26; 137/110

[56] References Cited

U.S. PATENT DOCUMENTS

| | | | |
|---|---|---|---|
| 3,135,281 | 6/1964 | Morgan | 137/110 |
| 3,315,694 | 4/1967 | Addison, Jr. | 73/203 X |
| 3,834,230 | 9/1974 | Auerbach | 73/199 |

*Primary Examiner*—Charles A. Ruehl
*Attorney, Agent, or Firm*—Raymond T. Majesko; John N. Hazelwood

[57] ABSTRACT

A device and method for preventing high pressure surges in fluidic material delivery systems to instruments such as a flowmeter, by the use of restrictors and a pilot operated valve to initially restrict the flow of the fluidic material before allowing total delivery thereof to prevent damage to such meters and other type members.

7 Claims, 2 Drawing Figures

U.S. Patent  Oct. 13, 1981  4,294,113

ANTI-SURGE SYSTEM FOR GASES AND OTHER MEDIA

High pressure surges which occur in gas or liquid fluidic media delivery systems, particularly upon startup, can inflict damage and even complete destruction upon gauges, flowmeters and other measuring and sensing instruments. Such damage and destruction, which can and does occur with some frequency, presents many problems. System shut-downs result in costly delays. Inaccurate measurements result in poor quality and unacceptable end-products. Serious danger can occur when toxic, flammable or explosive media escape to the atmosphere as a result of the destruction of the measuring and detection instruments.

Various in-line devices known as snubbers have long been used as a means of protecting measuring instruments from pressure surges. While these devices vary in design and application, they all provide the same basic function and effect; that is, to provide an obstruction in the line which buffers the metering and sensing instrument from the effect of a high pressure surge.

Snubbers provide effective and satisfactory protection for instruments, such as gauges, where the media being measured flows past the measuring device. However, in instruments, such as flowmeters, where the media flows through the instrument, a snubber is unsatisfactory because it restricts flow in the line on a constant basis.

A long history of flowmeter damage and destruction in plasma flame spray systems precipitated a need for some reliable protection system that would not impede normal gas flow. In these and similar systems where gas media is introduced into the system by a rapid acting valve, such as a solenoid valve, momentary sonic gas velocities are achieved. The reflected shock waves resulting from these velocities can and do inflict severe damage on sensitive instruments, such as flowmeters, transducers and the like. Flowmeters, being glass tubes containing a free floating solid ball, are especially prone to such damage.

Accordingly, it is an object of the invention to provide a device that will afford positive protection from in-line pressure surges, while at the same time, allowing full unimpeded flow of gas or liquid media under normal conditions.

It is a further object of the invention to provide for more secured containment of toxic, flammable or explosure media which may escape when unprotected measuring and sensing instruments are destroyed by high pressure surge effects.

While the anti-surge system of this invention was developed for the protection of flowmeters used in plasma flame spray systems, other applications will become obvious to those skilled in the art.

Figure 2:
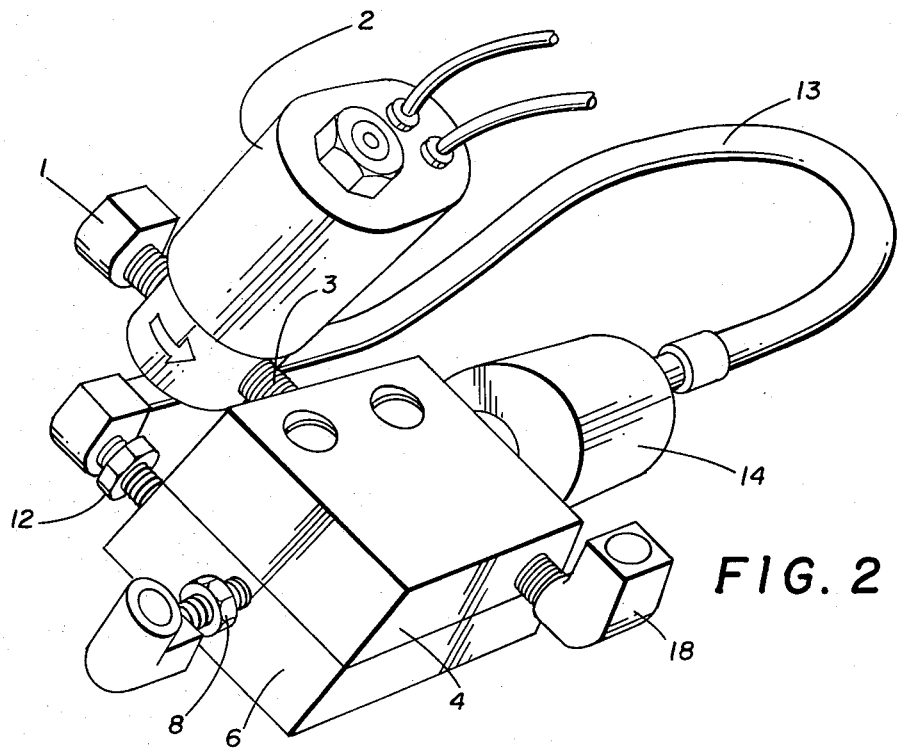

In the drawings:

FIG. 1 is a schematic diagram of the device to illustrate its various components and its manner and sequence of operation; and FIG 2 is a perspective view showing the device in the form of a unitary structure.

In accordance with the present invention, there is provided a device for preventing high pressure surges in fluidic material delivery systems to metering and measuring instruments. The device contains a means for flowing the fluidic material to a normally closed pilot operated valve. A means is provided for diverting flow therefrom through a restrictor directly to the metering or measuring instrument. Also, there is a means for diverting flow therefrom through a restrictor to the pilot of the pilot operated valve to produce a time delay in the total delivery of the fluidic material to the instrument.

Referring to the drawings, air or gas is turned on either mechanically or electrically. FIG. 2 illustrates a solenoid valve 2 for this purpose. It receives such fluidic media pneumatically from any desired source through a nipple or conduit 1. The fluidic media flows to the normally closed pilot operated valve 4 through conduit 3 and through a passageway 5 formed in a lower portion 6 of the device. The lower portion diverts flow in two directions. The fluidic media flows through a restrictor 8 through a conduit 9 to the flowmeter 10 or other measuring and metering device to produce a safe initial flow to the flowmeter.

It also flows through another restrictor 12 and through a conduit 13 to the pilot 14 of the pilot operated valve 4 to produce a time delay on the shifting of the pilot spool 16. It opens the pilot operated valve slowly for the slow passage of the media through nipple 18 as shown in FIG. 2 through a conduit 20 to the flowmeter 10 and the like to prevent damage thereto. Once fully open, it assures unrestricted flow for total delivery of the media to the meter 10.

FIG. 2 is a unitary structure which can be connected to a flow meter which in turn can be connected to a plasma jet device (not shown) by the use of suitable common conduits. However, other structures can be employed utilizing the device concept of the present invention.

The closed loop, pneumatically operated device of this invention effectively guards the flowmeters or other sensitive devices from the effects of the initial sonic velocities and automatically provides a soft start or laminar flow of gas or other media.

It is intended that the foregoing description and drawings be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A device for preventing high pressure surges in fluidic material delivery systems to metering and measuring instruments comprising means for flowing the fluidic material to a normally closed pilot operated valve, means for diverting flow therefrom through a restrictor directly to said instruments, means for diverting flow therefrom through a restrictor to the pilot of the pilot valve to produce a time delay in total delivery of the fluidic material to the instruments.

2. The device of claim 1, in which the fluidic material flows to the pilot valve through a solenoid valve.

3. The device of claim 1, in which the metering and measuring instrument include a flowmeter.

4. The device of claim 1, in which all of said means are part of a unitary structure.

5. A method for preventing high pressure surges in fluidic material delivery systems to metering and measuring instruments comprising flowing the fluidic material to a normally closed pilot operated valve, diverting flow therefrom through a restrictor directly to said instruments, further diverting flow therefrom through a restrictor to the pilot of the pilot valve to produce a time delay in total delivery of the fluidic material to the instruments.

6. The method of claim 5, in which the metering and measuring instruments include a flowmeter.

7. The device of claim 5, in which all of said flow to the metering and measuring instruments takes place through a unitary structure.

* * * * *